United States Patent
Takahashi

Patent Number: 5,787,358
Date of Patent: Jul. 28, 1998

[54] DYNAMIC CHANNEL ALLOCATION SYSTEM CAPABLE OF REALIZING CHANNEL ALLOCATION WITHOUT SPOILING ADVANTAGE OF INHERITANCE OF A PAST HISTORY

[75] Inventor: Hideaki Takahashi, Tokyo, Japan

[73] Assignee: NEC Corporation, Tokyo, Japan

[21] Appl. No.: 709,880

[22] Filed: Sep. 9, 1996

[30] Foreign Application Priority Data

Sep. 13, 1995 [JP] Japan .................. 7-260816

[51] Int. Cl.$^6$ .................. H04Q 7/00; H04Q 9/00
[52] U.S. Cl. .................. 455/512; 455/527; 455/452; 455/450
[58] Field of Search .................. 455/34.1, 34.2, 455/62, 54.1, 58.1, 58.2, 67.1, 527, 452, 512, 450

[56] References Cited

U.S. PATENT DOCUMENTS

| | | | |
|---|---|---|---|
| 5,613,200 | 3/1997 | Hamabe | 455/33.1 |
| 5,666,654 | 9/1997 | Kanai | 455/512 |
| 5,666,655 | 9/1997 | Ishikawa et al. | 455/512 |

FOREIGN PATENT DOCUMENTS

| | | |
|---|---|---|
| 0202485A2 | 11/1986 | European Pat. Off. . |
| 0666699A1 | 8/1995 | European Pat. Off. . |
| 61-244137 | 10/1986 | Japan . |
| 494228 | 3/1992 | Japan . |
| 4220822 | 8/1992 | Japan . |
| 4345331 | 12/1992 | Japan . |
| 2266433 | 10/1993 | United Kingdom . |

OTHER PUBLICATIONS

British Search Report.
Y. Furuya et al.; "Channel Segregation, A Distributed Adaptive Channel Allocation Scheme for Mobile Radio Communications"; Institute of Electronics and Communication Engineers, 1986 General National Conference, pp. 10–47.

*Primary Examiner*—Tommy P. Chin
*Assistant Examiner*—David R. Vincent
*Attorney, Agent, or Firm*—Whitham, Curtis & Whitham

[57] ABSTRACT

In a dynamic channel allocation system, upon every communication request, selection is made of a channel having a maximum priority degree (step 1004). Judgement is made about whether or not the channel is an idle channel (step 1005). If it is an idle channel, its priority degree P is increased by a priority function $\Delta P(x)$ determined by a priority degree modification frequency x and this channel is allocated (steps 1006 and 1007). If it is not an idle channel, the priority degree P is decreased by the priority function $\Delta P(x)$ (step 1008). Subsequently, the priority degree modification frequency x is increased by +1. When x reaches an upper limit value xo, the priority degree modification frequency x is not reset but is given as $x = x1 < xo$.

7 Claims, 12 Drawing Sheets

| CHANNEL | $C_1$ | $C_2$ | $C_3$ | ... | $C_i$ | ... | $C_n$ |
|---|---|---|---|---|---|---|---|
| PRIORITY DEGREE | $P_1$ | $P_2$ | $P_3$ | ... | $P_i$ | ... | $P_n$ |

PRIOR ART
FIG. 3

| CHANNEL | $C_1$ | $C_2$ | $C_3$ | ... | $C_i$ | ... | $C_n$ |
|---|---|---|---|---|---|---|---|
| MASTER PRIORITY DEGREE | $P_1$ | $P_2$ | $P_3$ | ... | $P_i$ | ... | $P_n$ |
| SLAVE PRIORITY DEGREE | $P'_1$ | $P'_2$ | $P'_3$ | ... | $P'_i$ | ... | $P'_n$ |

FIG. 9

DYNAMIC CHANNEL ALLOCATION SYSTEM CAPABLE OF REALIZING CHANNEL ALLOCATION WITHOUT SPOILING ADVANTAGE OF INHERITANCE OF A PAST HISTORY

BACKGROUND OF THE INVENTION

This invention relates to a dynamic channel allocation system for a mobile communication network.

In a field of such a mobile communication network, use has traditionally been made of a fixed allocation system for the purpose of effective use of frequencies. In the fixed allocation system, available frequencies for each radio base station (simply called a base station hereinafter) are fixedly restricted at the stage of designing a station arrangement, considering occurrence of an interference at each base station. The fixed allocation system, however, can not flexibly deal with originating calls varying from time to time. For example, it is assumed that all assigned channels are busy in a particular base station X while an adjacent base station Y has a sufficient number of idle channels. Then, a newly originating call directed to the base station X inevitably results in a call loss. If the base station X can use any idle channel in the base station Y, the call in question is prevented from resulting in the call loss.

In order to remove the disadvantage in the above-mentioned fixed allocation system, proposal is made of a dynamic channel allocation system as a technique allowing each base station to freely use all channels. Although this system involves various concepts, it is a basic idea that all base stations are allowed to freely use the channels provided that the use is effected after checking whether or not a particular channel to be used in each base station is currently used by any other base station. In this system, however, if channel selection is independently carried out neglecting a service area arrangement for the base stations, an interference may be caused to occur as a result of selection error under the influence of fading.

In view of the above, proposal is made of a dynamic channel allocation system according to a channel segregation system (see Yukitsuna Furuya et al "Channel Segregation, A Distributed Adaptive Channel Allocation Scheme for Mobile Radio Communications", Institute of Electronics and Communication Engineers, 1986 General National Conference, 10–47 and Japanese Unexamined Patent Publication No. 244137/1986). In the dynamic channel allocation system according to the channel segregation system, each base station individually learns the service area arrangement to reduce the interference, as will later be described more in detail.

The dynamic channel allocation system according to the channel segregation system uses the priority function $\Delta P(x)$ in order to calculate the priority degree P. As the priority function $\Delta P(x)$, various proposals have been made. Among those, $\Delta P(x)$ using the priority degree modification frequency x as a parameter as illustrated in FIG. 4 is the majority and can easily calculate the priority degree P. However, in order to implement this function, the value of the priority degree modification frequency x is diverged to the infinite. In view of the above, the counter counting the value of the priority degree modification frequency x is reset into zero when an overflow condition or the upper limit value is reached. In this event, however, accumulation of the past history results in vain and the system can not exhibit a learning effect as a whole.

SUMMARY OF THE INVENTION

It is therefore an object of this invention to provide a dynamic channel allocation system which is capable of effectively realizing channel allocation without spoiling the advantage of inheritance of a past history.

Other objects of this invention will become clear as the description proceeds.

According to an aspect of this invention, there is provided a dynamic channel allocation system in which communication is carried out between a radio base station and a radio mobile station by the use of a plurality of channels, each channel being given a priority degree, one of the channels that has a higher priority degree being preferentially allocated to the communication, the system comprising: resetting means for resetting a priority degree modification frequency counter into zero; first making means for making the priority degree modification frequency counter count up by +1 upon every communication request from the radio mobile station; selecting means for selecting as a selected channel a particular channel having a higher priority degree upon every communication request from the radio mobile station; allocating means for allocating the selected channel to each communication request when the selected channel is an idle channel and for increasing the priority degree of the selected channel by a first priority function determined by the value of the priority degree modification frequency counter; decreasing means for decreasing the priority degree of the selected channel by a second priority function determined by the value of the priority degree modification frequency counter when the selected channel is not an idle channel; judging means for judging whether or not the value of the priority degree modification frequency counter reaches an upper limit value; and second making means for making the priority degree modification frequency counter have an intermediate value between zero and the upper limit value.

According to another aspect of this invention, there is also provided a dynamic channel allocation system in which communication is carried out between a radio base station and a radio mobile station by the use of a plurality of channels, each channel being given a priority degree, one of the channels that has a higher priority degree being preferentially allocated to the communication, the system comprising: master channel allocation means for allocating one of the channels that has a higher master priority degree to the communication, and slave channel allocation means for allocating one of the channels that has a higher slave priority degree to the communication; the slave channel allocation means modifying the slave priority degree with the master priority degree used as an initial value; the slave channel allocation means being operated when the slave priority degree is stable with respect to the master priority degree; and the slave channel allocation means being operated after the master channel allocation means is operated when the slave priority degree is not stable with respect to the master priority degree.

BRIEF DESCRIPTION OF THE DRAWINGS

FIG. 3 is a view for showing a priority degree table used in a conventional dynamic channel allocation system;

FIG. 9 is a view for showing a priority degree table used in the dynamic channel allocation system according to the first embodiment of this invention;

DESCRIPTION OF THE PREFERRED EMBODIMENT

Referring to FIGS. 1 to 6, description will be made about the dynamic channel allocation system according to the channel segregation system mentioned in the preamble of the instant specification for a better understanding of the present invention.

Figure 1:
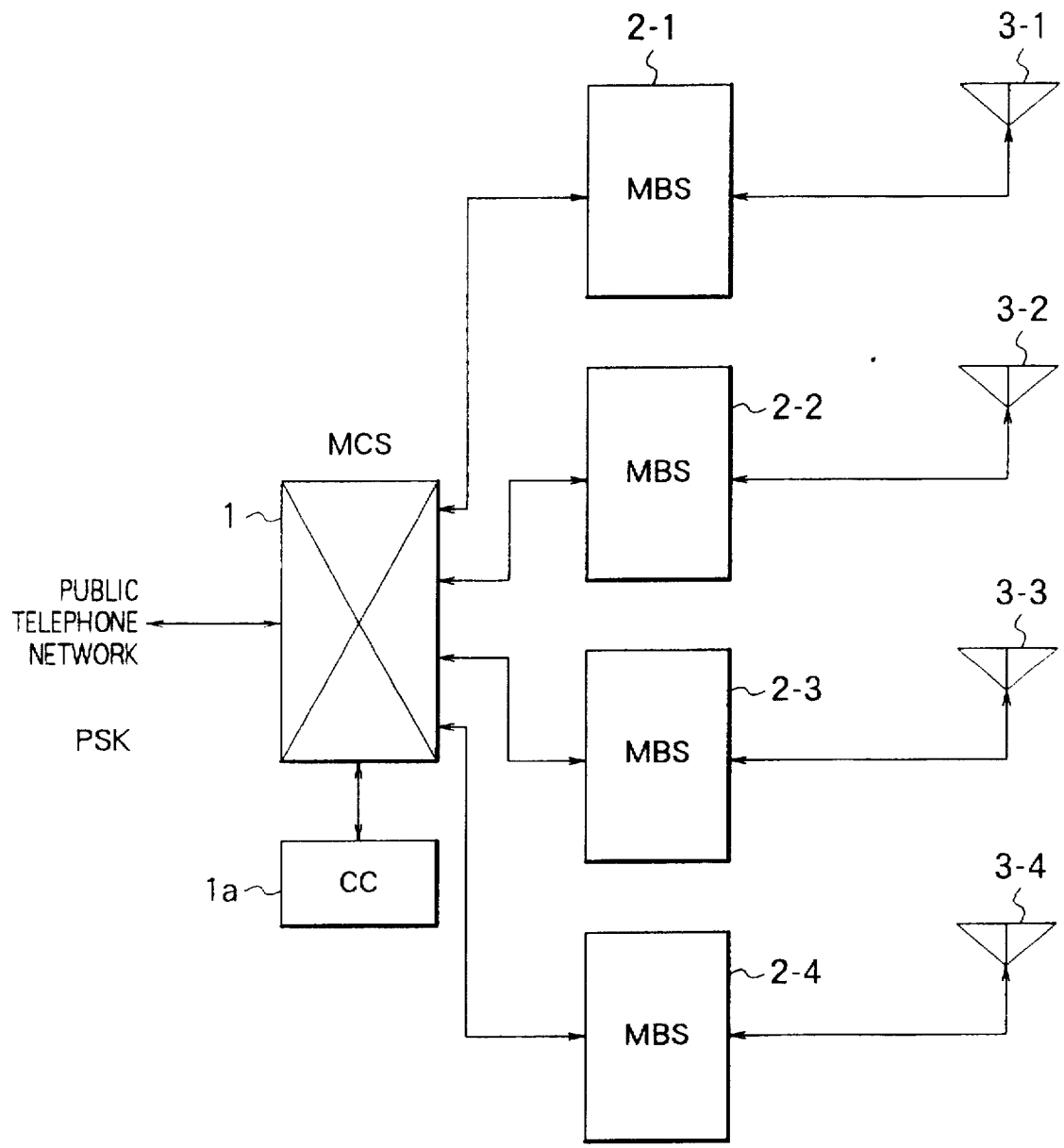
FIG. 1 is a view for showing a typical mobile communication system.

Referring now to FIG. 1, a mobile unit exchange 1 is for controlling call connection with a public telephone network and for controlling call connection distribution for a plurality of, for example, four base stations 2-1 through 2-4. The mobile unit exchange is provided with a control circuit $1a$. The base stations 2-1 through 2-4 are connected to antenna units 3-1 to 3-4 located at different positions.

Figure 2:
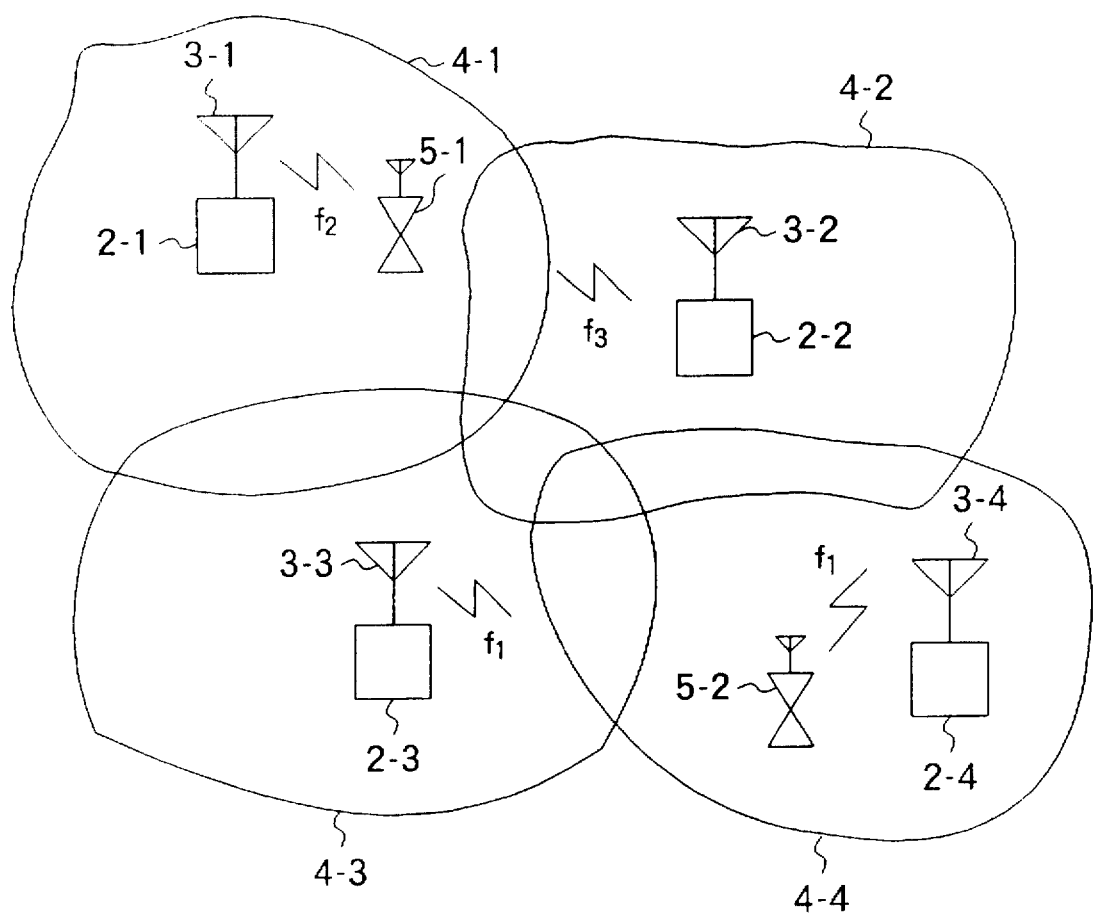
FIG. 2 is a view for describing service areas in the typical mobile communication system illustrated in FIG. 1.

The base stations 2-1 through 2-4 have service areas 4-1 through 4-4, for example, as illustrated in FIG. 2, respectively. In FIG. 2, reference numerals 5-1 and 5-2 represent radio mobile stations (hereinafter simply called mobile stations). In this case, use of a common frequency $f_1$ in the service areas 4-3 and 4-4 at the same time results in mutual interference waves in an overlapping area therebetween. On the other hand, use of different frequencies $f_2$ and $f_3$ in the service areas 4-1 and 4-2 causes no interference waves in an overlapping area therebetween.

Channels $C_1, C_2, \ldots, C_i, \ldots, C_n$ in the service area of each base station are given priority degrees $P_1, P_2, \ldots, P_i, \ldots, P_n$ as illustrated in FIG. 3, respectively. It is noted here that the channels involve the concept of slots used in a time division fashion.

Figure 4:
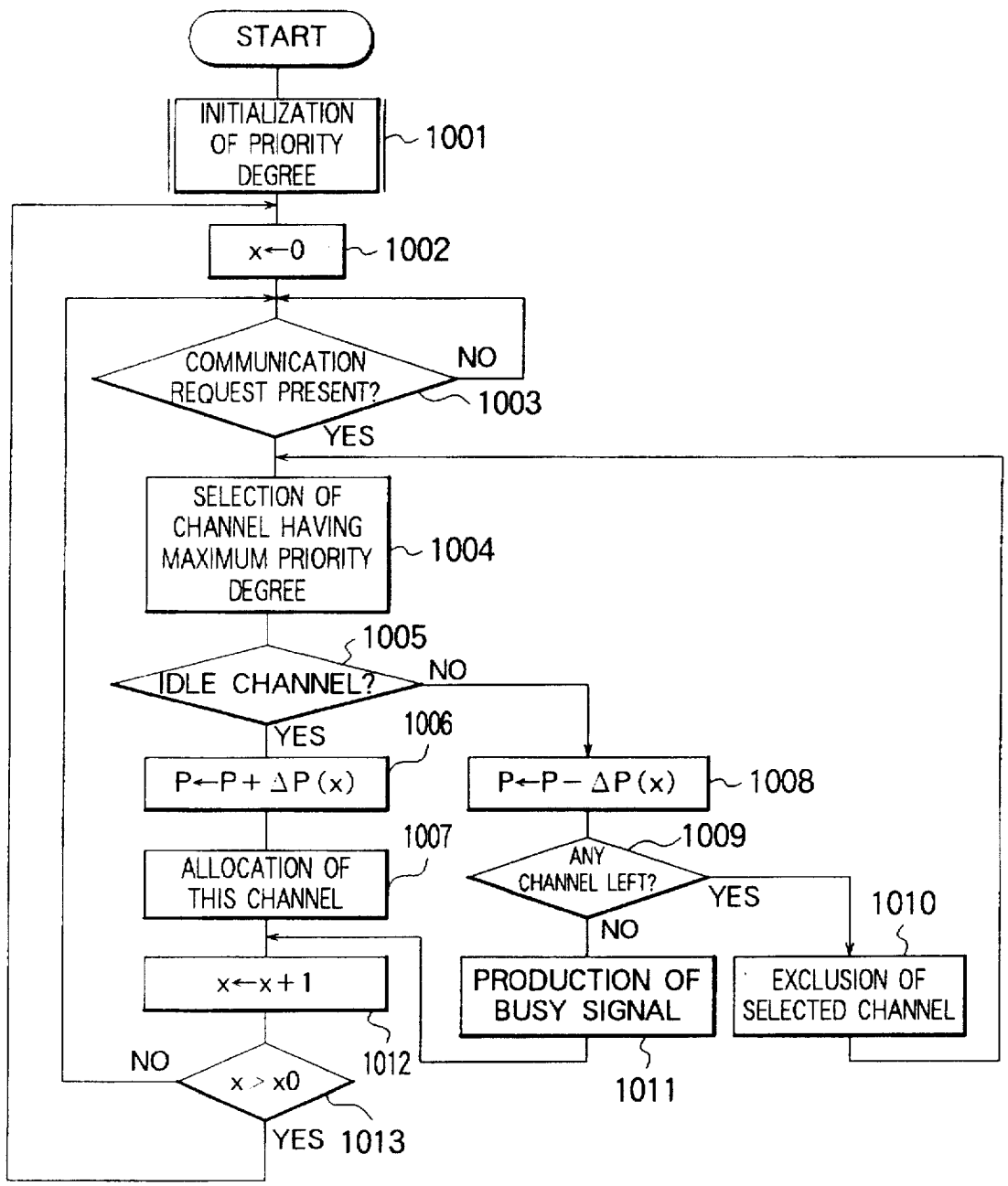
FIG. 4 is a flow chart for describing the conventional dynamic channel allocation system.

The priority degrees $P_1, P_2, \ldots, P_i, \ldots, P_n$ illustrated in FIG. 3 are renewed by a routine shown in FIG. 4. The routine shown in FIG. 4 is provided for each of the base stations 2-1 through 2-4. In the illustrated example, the control circuit $1a$ in FIG. 1 stores the routine shown in FIG. 4 for each of all the base stations 2-1 through 2-4.

At first in a step 1001, initial values of the priority degrees $P_i$ (i=1, 2, ..., n) are acquired from an external memory or an internal memory and set as system data.

In a step 1002, a priority degree modification frequency counter x is reset into 0.

In a step 1003, a communication request from any mobile station is waited. Only when the communication request is issued from any mobile station, operation proceeds to a step 1004.

In the step 1004, a table in FIG. 3 is read from the memory to select as a selected channel a particular channel having a highest priority degree.

In a step 1005, judgement is made about whether or not the selected channel selected in the step 1004 is an idle channel. If the result of judgement indicates an idle channel, operation proceeds to a step 1006. If it is not an idle channel, operation proceeds to a step 1008.

In the step 1006, the priority degree P of the selected channel selected in the step 1004 is increased according to:

$$P \leftarrow P + \Delta P(x)$$

Figure 5:
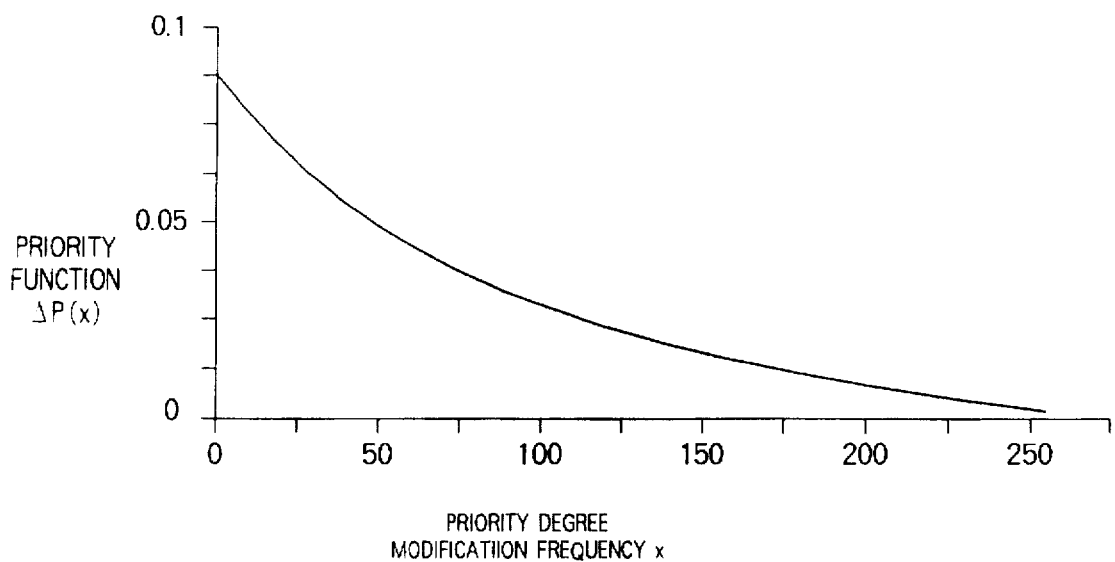
FIG. 5 is a graph for showing a priority degree function in FIG. 4.

Herein, $\Delta P(x)$ is a priority function determined by the value x of the priority degree modification frequency counter and has a greater value when a priority degree modification frequency is smaller, for example, as illustrated in FIG. 5. Subsequently, in a step 1007, the selected channel selected in the step 1004 is allocated to the communication.

On the other hand, in the step 1008, the priority degree P of the selected channel selected in the step 1004 is decreased according to:

$$P \leftarrow P - \Delta P(x)$$

Subsequently, in a step 1009, judgement is made about whether or not any channel is left unselected in the step 1004. If any channel is left, the operation returns to the step 1004 after the selected channel is excluded in a step 1010. On the other hand, if no channel is left, a busy signal is produced in a step 1011 as a call loss.

The flow of operation in each of the steps 1007 and 1011 proceeds to a step 1012 where the value x of the priority degree modification frequency counter is increased by +1. Subsequently, in a step 1013, judgement is made about whether or not the value [x] of the priority degree modification frequency counter reaches an upper limit value x0, for example, 256. If the result of judgement indicates $x \leq x0$, the operation returns to the step 1003. On the other hand, if $x > x0$, the operation proceeds to the step 1003 after the priority degree modification frequency counter is reset in the step 1002.

As described, in this system, the priority degree is given to each channel and the channel having a higher priority degree is preferentially allocated. The order of priority is determined in such a manner that the priority degree is increased and decreased every time when the channel is used and can not be used, respectively.

As also mentioned in the preamble of the instant specification, the above-described dynamic channel allocation system according to the channel segregation system uses the priority function $\Delta P(x)$ in order to calculate the priority degree P. As the priority function $\Delta P(x)$, various proposals have been made. Among those, $\Delta P(x)$ using the priority degree modification frequency x as a parameter as illustrated in FIG. 5 is the majority and can easily calculate the priority degree P. However, in order to implement this function, the value of the priority degree modification frequency x is diverged to the infinite. In view of the above, the counter counting the value of the priority degree modification frequency x is reset into zero when an overflow condition or the upper limit value is reached. In this event, however, accumulation of the past history results in vain and the system can not exhibit a learning effect as a whole.

Figure 6:
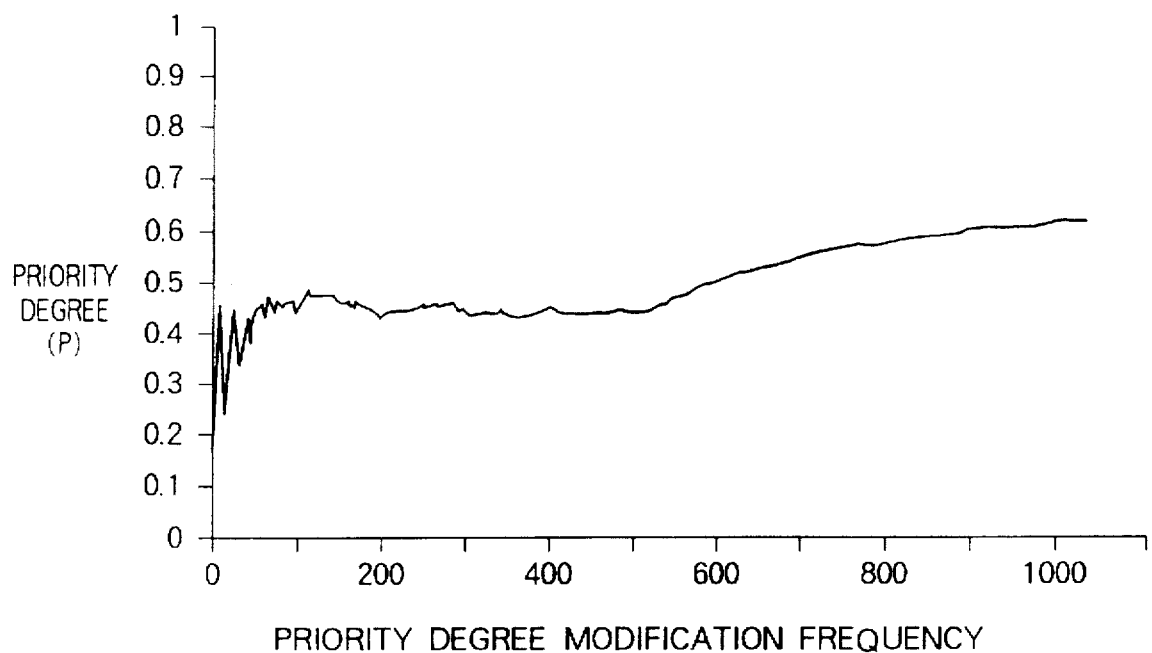
FIG. 6 is a timing chart for illustrating a priority degree simulation result according to the conventional dynamic channel allocation system in FIG. 4.

The priority function $\Delta P(x)$ is greater and smaller when the value of x is smaller and greater, respectively. Accordingly, a stable condition is quickly achieved in an initial stage of learning the service area arrangement. However, once the service area is settled well, no more than a slow reaction is possible upon occurrence of any drastic environmental change, for example, additional installation of a new base station within the service area. Thus, it takes a long time before another stable condition is reached. By way of example, FIG. 6 shows a simulation result in case where the priority function $\Delta P(x)$ in FIG. 5 is used and an interference detection ratio varies from 0.5 to 0.8 since when the priority degree modification frequency is counted up to 500.

Figure 7:
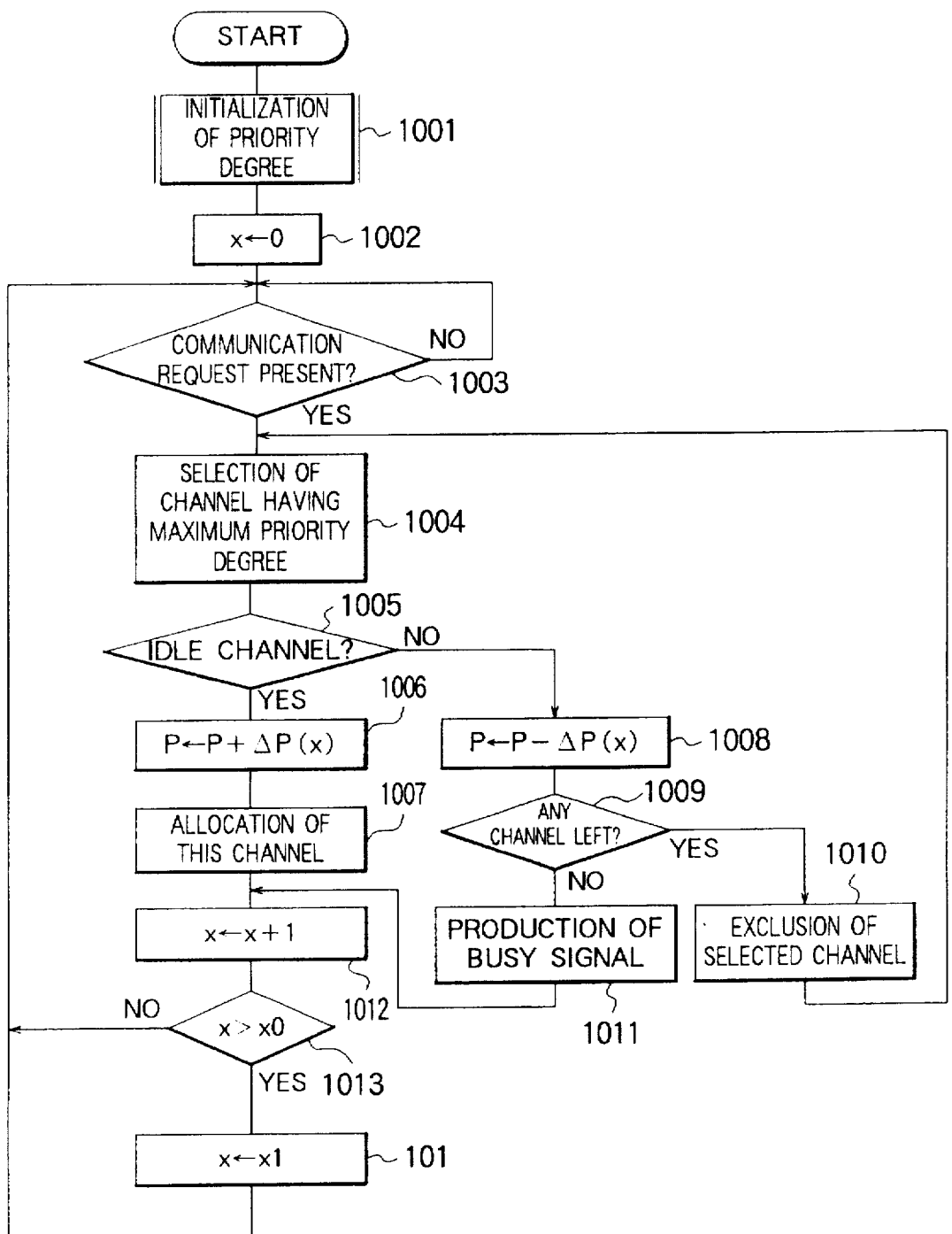
FIG. 7 is a flow chart for illustrating a dynamic channel allocation system according to a first embodiment of this invention.

Referring in turn to FIG. 7, description proceeds to a dynamic channel allocation system according to a first embodiment of this invention.

In FIG. 7, the flow chart is similar to that illustrated in FIG. 4 except that a step 101 is added thereto. Specifically, when the value x of a priority degree modification frequency counter reaches an upper limit value xo in a step 1113, the following operation is carried out in the step 101:

$$x \leftarrow x1$$

For example, x1=128 when x1=xo/2 and xo=256.

Referring to FIG. 7, the embodiment can be implemented by a single counter alone and the priority degree modification frequency counter is prevented from an overflow condition or the upper limit value in a simplest manner.

Figure 8:
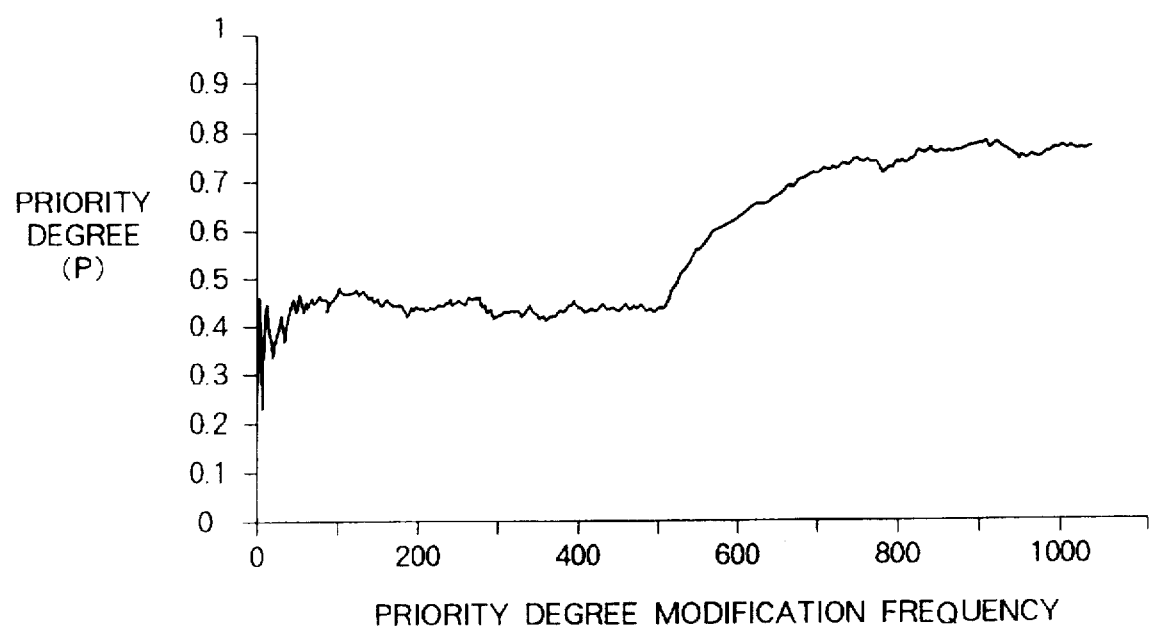
FIG. 8 is a timing chart for illustrating a priority degree simulation result according to the dynamic channel allocation system illustrated in FIG. 1.

FIG. 8 shows a simulation result when the system illustrated in FIG. 7 is used. Like FIG. 6, the illustrated example is directed to the case where an interference detection ratio varies from 0.5 to 0.8 since when the modification frequency is counted up to 500. In this example, the maximum count value x0 and a return value x1 are equal to 256 and 128, respectively. Although slight fluctuation is observed when the count value x is returned by 128 counts, reaction is quick against the drastic change of the priority degree in the case of FIG. 8 as compared with the case of FIG. 6.

Referring to FIGS. 9 to 12, description will proceed to a dynamic channel allocation system according to a second embodiment of this invention.

FIG. 9 shows priority degrees assigned to channels $C_1$, $C_2$, ..., $C_i$, ..., $C_n$ used in a dynamic channel allocation system according to a second embodiment of this invention. Specifically, the channels are assigned with master priority degrees $P_1$, $P_2$, ..., $P_i$, ..., $P_n$ and slave priority degrees $P_1'$, $P_2'$, ..., $P_i'$, ..., $P_n'$, respectively. The master priority degrees $P_1$, $P_2$, ..., $P_i$, ..., $P_n$ are used for channel allocation in master channel allocation control while the slave priority degrees $P_1'$, $P_2'$, ..., $P_i'$, ..., $P_n'$ are used for channel allocation in slave channel allocation control.

Figure 10:
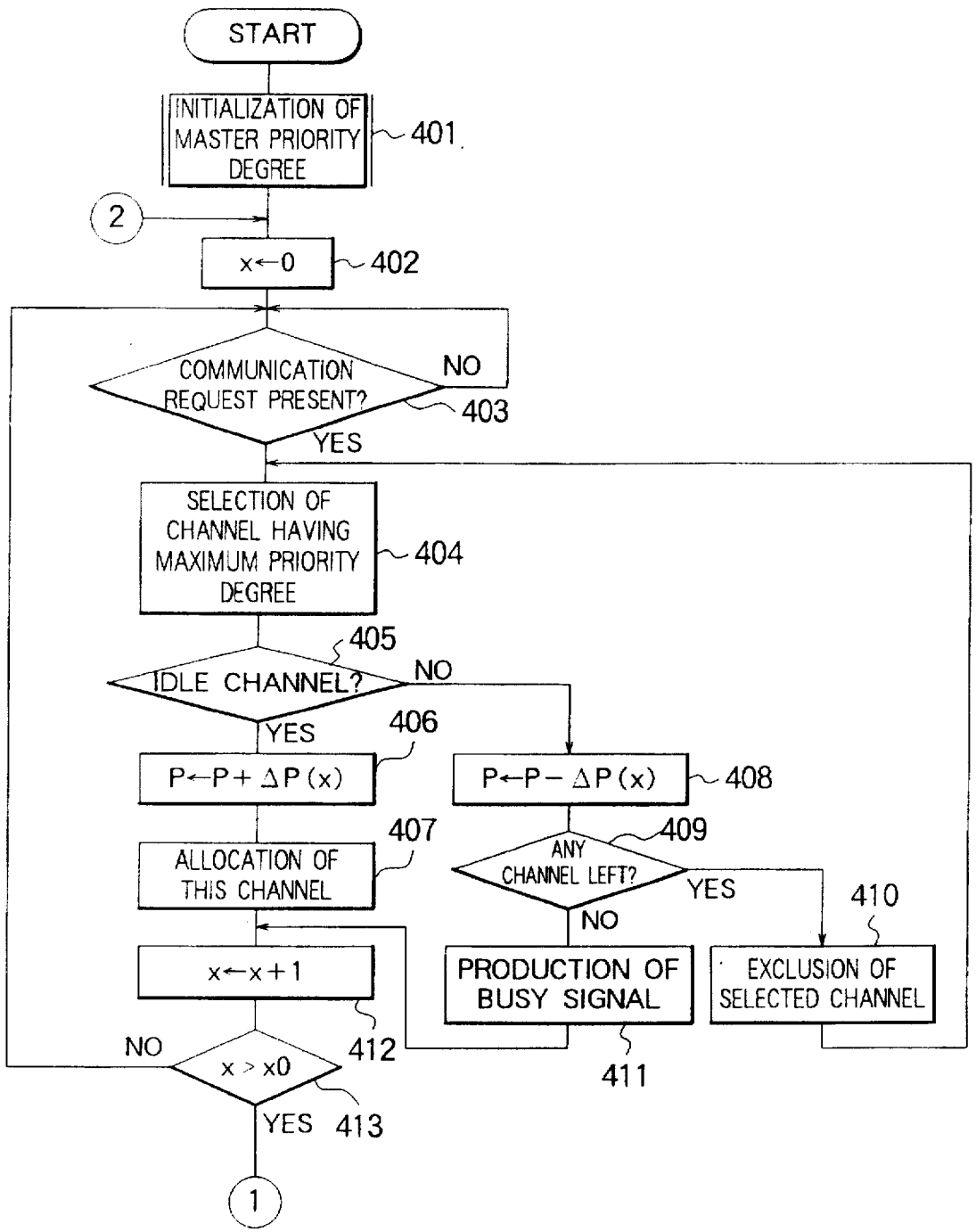
FIG. 10 is a primary flow chart for describing a dynamic channel allocation system according to a second embodiment of this invention.
Figure 11:
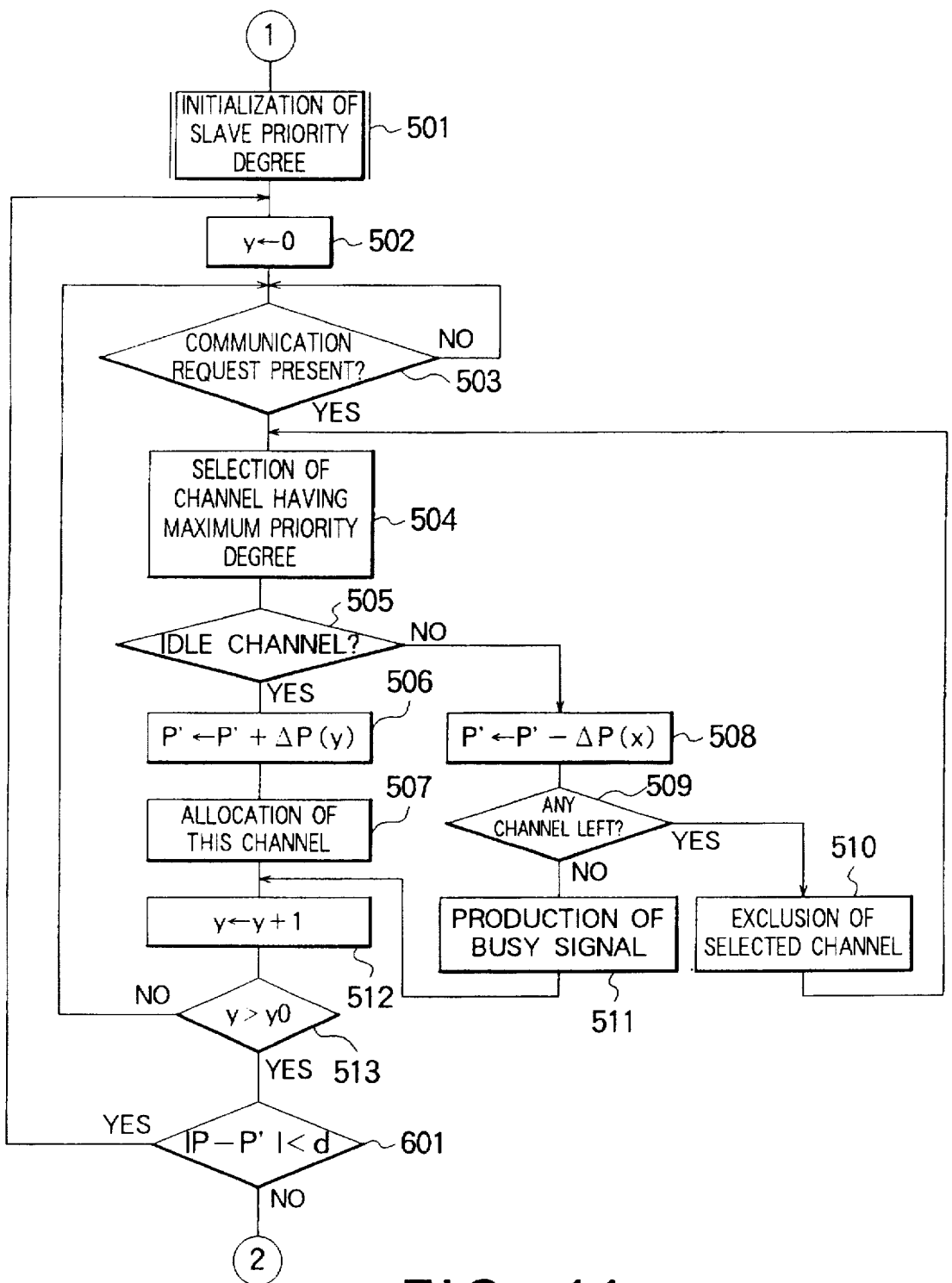
FIG. 11 is a secondary flow chart for describing the dynamic channel allocation system according to the second embodiment of this invention.

FIGS. 10 and 11 show flow charts for describing the channel allocation by the use of the master priority degrees and the slave priority degrees. Referring to FIGS. 10 and 11, the master channel allocation control is carried out in steps 401 through 410 while the slave channel allocation control is carried out in steps 501 through 510. In a step 601, switching control is carried out between the master channel allocation control and the slave channel allocation control.

Description will be made as regards the master channel allocation control.

In the step 401, initial values of the master priority degrees $P_i$ (i=1, 2, ..., n) are acquired from an external memory or an internal memory and set as system data. Subsequently, in the step 402, a master priority degree modification frequency counter x is reset into 0. Then, in the step 403, a communication request from any mobile station is waited. Only when the communication request is issued from any mobile station, operation proceeds to the step 404.

In the step 404, a table in FIG. 9 is read from the memory to select as a selected channel a particular channel having a highest master priority degree. Then, in the step 405, judgement is made about whether or not the selected channel selected in the step 404 is an idle channel. If the result of judgement indicates an idle channel, operation proceeds to the step 406. If it is not an idle channel, operation proceeds to the step 408. Subsequently, in the step 406, the master priority degree P of the selected channel selected in the step 404 is increased according to:

$$P \leftarrow P + \Delta P(x)$$

Herein, $\Delta P(x)$ is a priority function determined by the value x of the priority degree modification frequency counter and has a greater value when a priority degree modification frequency is smaller, for example, as illustrated in FIG. 5. Subsequently, in the step 407, the selected channel selected in the step 404 is allocated to the communication.

On the other hand, in the step 408, the master priority degree P of the selected channel selected in the step 404 is decreased according to:

$$P \leftarrow P - \Delta P(x)$$

Subsequently, in the step 409, judgement is made about whether or not any channel is left unselected in the step 404. If any channel is left, the operation returns to the step 404 after the selected channel is excluded in the step 410. On the other hand, if no channel is left, a busy signal is produced in a step 411 as a call loss.

The flow of operation in each of the steps 407 and 411 proceeds to a step 412 where the value x of the master priority degree modification frequency counter is increased by +1. Subsequently, in a step 413, judgement is made about whether or not the value [x] of the master priority degree modification frequency counter reaches an upper limit value x0, for example, 256. If the result of judgement indicates $x \leq x0$, the operation returns to the step 403. On the other hand, if x>x0, the operation proceeds to the slave channel allocation control.

As described, in the master channel allocation control, the master priority degree P is given to each channel and the channel having a higher master priority degree is preferentially allocated. The order of priority is determined in such a manner that the priority degree is increased and decreased every time when the channel is used and can not be used, respectively.

Next, description will be made as regards the slave channel allocation control.

In the step 501, the master priority degrees $P_i$ (i=1, 2, ..., n) are set as initial values of the slave priority degrees $P_i'$ (i=1, 2, ..., n). Subsequently, in the step 502, a slave priority degree modification frequency counter y is reset into 0. Then, in the step 503, a communication request from any mobile station is waited. Only when the communication request is issued from any mobile station, operation proceeds to the step 504.

In the step 504, the table in FIG. 9 is read from the memory to select as a selected channel a particular channel having a highest slave priority degree. Then, in the step 505, judgement is made about whether or not the selected channel selected in the step 504 is an idle channel. If the result of judgement indicates an idle channel, operation proceeds to the step 506. If it is not an idle channel, operation proceeds to the step 508. Subsequently, in the step 506, the slave priority degree P' of the selected channel selected in the step 504 is increased according to:

$$P' \leftarrow P' + \Delta P(y)$$

Herein, $\Delta P(y)$ is a priority function determined by the value y of the priority degree modification frequency counter and has a greater value when a priority degree modification frequency is smaller, for example, as illustrated in FIG. 5. Subsequently, in the step 507, the selected channel selected in the step 504 is allocated to the communication.

On the other hand, in a step 508, the slave priority degree P' of the selected channel selected in the step 504 is decreased according to:

$$P' \leftarrow P' - \Delta P(y)$$

Subsequently, in the step 509, judgement is made about whether or not any channel is left unselected in the step 504. If any channel is left, the operation returns to the step 504 after the selected channel is excluded in the step 510. On the other hand, if no channel is left, a busy signal is produced in a step 511 as a call loss.

The flow of operation in each of the steps 507 and 511 proceeds to a step 512 where the value y of the slave priority degree modification frequency counter is increased by +1. Subsequently, in a step 513, judgement is made about whether or not the value y of the slave priority degree modification frequency counter reaches an upper limit value y0, for example, 256. If the result of judgement indicates y≦y0, the operation returns to the step 503. On the other hand, if y>y0, the operation proceeds to the step 601.

As described, in the slave channel allocation control, the slave priority degree P' is given to each channel with the master priority degree P used as the initial value and the channel having a higher slave priority degree is preferentially allocated. The order of priority is determined in such a manner that the priority degree is increased and decreased every time when the channel is used and can not be used, respectively.

In the step 601, judgement is made of the stability of the slave priority degree $P_i'$ (i=1, 2, . . . , n). Specifically, calculation is made of a difference between the master priority degree $P_i$ and the slave priority degree $P_i'$.

$$|P_1-P_1'|+|P_2-P_2'|+ \ldots +|P_n-P_n'|<d$$

Depending upon whether or not the above-mentioned condition is satisfied, the stability of the slave priority degree is judged. When the result of judgement indicates that the slave priority degree $P_i'$ approximates the master priority degree $P_i$ and the slave priority degree $P_i'$ is stable, the slave channel allocation control in the steps 501 through 513 is continuously executed. On the other hand, when it is judged that the slave priority degree $P_i'$ does not approximate the master priority degree $P_i$ and the slave priority degree $P_i'$ is not stable, the master channel allocation control in the steps 401 through 413 is executed again. As a result, the initial value of the slave priority degree $P_i'$ is modified.

Figure 12:
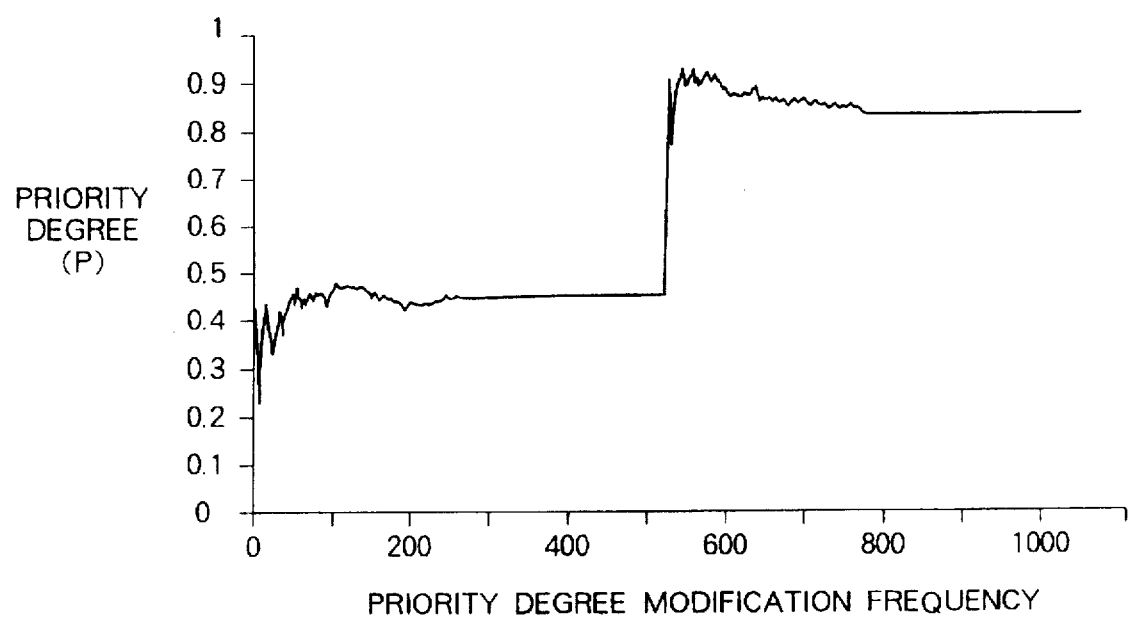
FIG. 12 is a timing chart for illustrating a priority degree simulation result according to the dynamic channel allocation system in FIGS. 10 and 11.

FIG. 12 shows a simulation result when the system in FIGS. 10 and 11 is used. In the illustrated example, the difference d between P and P' is equal to 0.01. As compared with the cases in FIG. 6 and FIG. 8, a stable point is quickly reached. Once the stable condition is achieved, no fluctuation in priority degree is observed.

As described above, according to this invention, it is possible to solve the problem when the priority degree modification frequency reaches the overflow condition or the upper limit value and to quickly bring the priority degree to the stable point with the past history maintained, even in case of occurrence of any drastic environmental change.

While this invention has thus far been described in specific conjunction with a few embodiments thereof, it will now be readily possible for one skilled in the art to put this invention into effect in various other manners. For example, although the common priority function ΔP is used both in the master channel control and the slave channel control in the above-mentioned second embodiment, different functions may be used. Moreover, the upper limit values xo and yo may be same or different.

What is claimed is:

1. A dynamic channel allocation system in which communication is carried out between a radio base station and a radio mobile station by the use of a plurality of channels, each channel being given a priority degree, one of said channels that has a higher priority degree being preferentially allocated to said communication, said system comprising:

resetting means for resetting a priority degree modification frequency counter into zero;

first making means for making said priority degree modification frequency counter count up by +1 upon every communication request from said radio mobile station;

selecting means for selecting as a selected channel a particular channel having a higher priority degree upon every communication request from said radio mobile station;

allocating means for allocating said selected channel to each communication request when said selected channel is an idle channel and for increasing said priority degree of said selected channel by a first function determined by the value of said priority degree modification frequency counter;

decreasing means for decreasing said priority degree of said selected channel by a second priority function determined by the value of said priority degree modification frequency counter when said selected channel is not an idle channel;

judging means for judging whether or not the value of said priority degree modification frequency counter has reached an upper limit value; and second making means for making said priority degree modification frequency counter have an intermediate value between zero and said upper limit value, wherein accumulation of a past history is inheritably available for realizing a rapid channel allocation and quickly bringing said priority degree to a stable point with said past history.

2. A dynamic channel allocation system as claimed in claim 1, wherein each of said first and said second priority functions is greater when said priority degree modification frequency counter has a smaller value.

3. A dynamic channel allocation system as claimed in claim 1, wherein said first and said second priority functions are identical.

4. A method for dynamically allocating communication channels between a radio base station and a plurality of mobile radios, comprising the steps of:

initializing each of a plurality of radio channels with an assigned priority P;

setting a priority degree modification frequency counter for recording a priority degree modification frequency to zero;

checking if a communication request is present;

selecting one of said plurality of radio channels having the highest priority P when said communication request is present;

checking whether said selected communication channel is idle, if said selected communication channel is idle then:

modifying the assigned priority P of said selected communication channel by adding a priority first function evaluated at a current value of said priority degree modification frequency counter; and allocating said selected communication channel to satisfy said communication request;

if said selected communication channel is busy then:

modifying the assigned priority P of said selected communication channel by subtracting a priority second function evaluated at a current value of said priority degree modification frequency counter; and checking if there are any other of said plurality of communication channels available, if no, then producing a busy signal, if yes, then excluding said selected communication channel and branching back to said selecting step;

incrementing said priority degree modification frequency counter by one;

checking to see if said priority degree modification frequency counter has reached an overflow value, if no, branching back to said step of checking if a communication request is present; and if yes, assigning an intermediate value to said priority degree modification frequency counter to preserve at least a portion of said priority degree modification frequency history, and then branching back to said step of checking if a communication request is present.

5. A method for dynamically allocating communication channels between a radio base station and a plurality of mobile radios as recited in claim 4 wherein said overflow value is 256.

6. A method for dynamically allocating communication channels between a radio base station and a plurality of mobile radios as recited in claim 5 wherein said intermediate value is 128 for preserving the past history of at least a last 128 priority degree modification frequencies.

7. A method for dynamically allocating communication channels between a radio base station and a plurality of mobile radios as recited in claim 9 wherein said priority degree P comprises a master priority degree and a slave priority degree.

* * * * *